Sept. 3, 1963 R. NEWMAN 3,102,765
SLIP-RING CONSTRUCTION FOR POWER CABLE REEL
Filed Jan. 23, 1959 2 Sheets-Sheet 1

Richard Newman
INVENTOR.

Sept. 3, 1963 R. NEWMAN 3,102,765
SLIP-RING CONSTRUCTION FOR POWER CABLE REEL
Filed Jan. 23, 1959 2 Sheets-Sheet 2
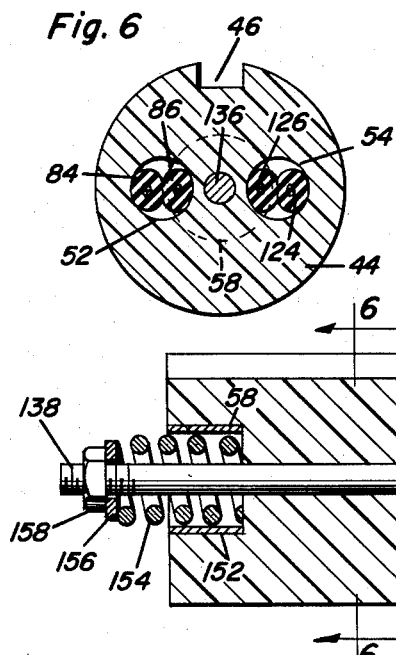
Fig. 6
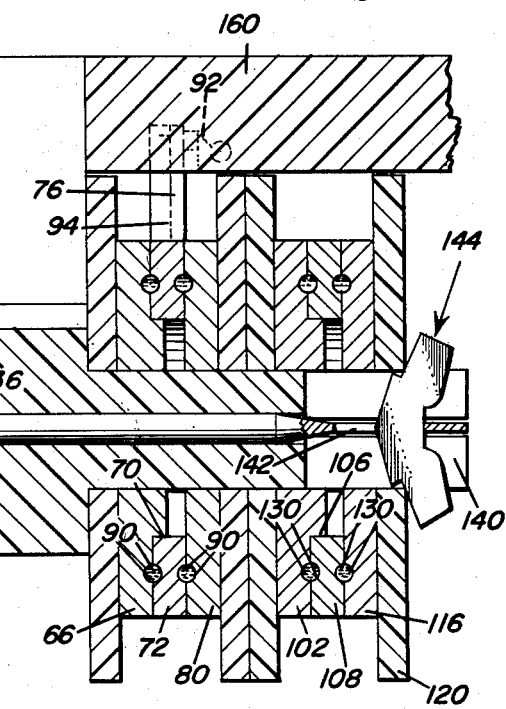
Fig. 3
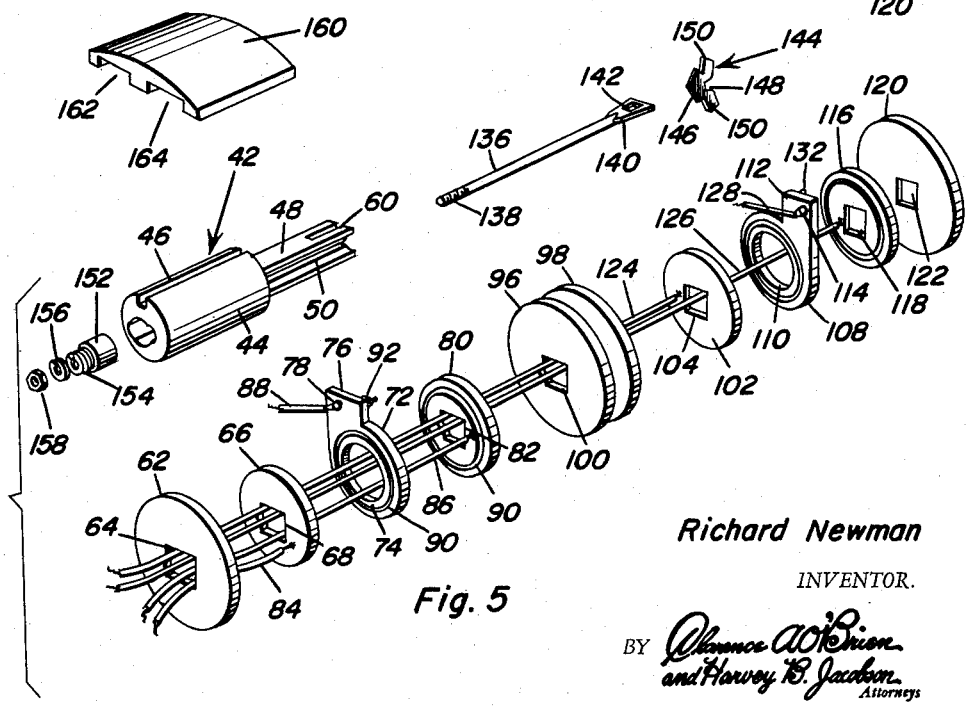
Fig. 4
Fig. 5
Richard Newman
INVENTOR.

United States Patent Office 3,102,765
Patented Sept. 3, 1963

3,102,765
SLIP-RING CONSTRUCTION FOR POWER
CABLE REEL
Richard Newman, P.O. Box 51, Hi Hat, Ky.
Filed Jan. 23, 1959, Ser. No. 788,607
9 Claims. (Cl. 339—5)

This invention relates in general to new and useful electrical fixtures, and more specifically to a reel for electrical cables, which reel is provided with an improved slip ring construction.

Heretofore there have been devised numerous types of reels for electrical cables which are of such a nature that the reels may be rotated and the electrical connection between the wire reeled thereon and a fixed electrical source maintained. However, in the prior reel construction the slip rings have normally been of such a nature that they cannot handle the desired load in many instances. In a slip ring construction it is necessary that the proper amount of contact surface be available at all times and at the same time the slip rings must be free to rotate with respect to each other. This is a problem which has heretofore not been properly solved.

It is therefore the primary object of this invention to provide a slip ring construction for reels for electrical cables, the slip ring construction including pairs of slip rings which are spaced by an insulator and which are disposed in face-to-face engagement, the slip rings being of a heavy duty construction and providing a large surface contact, there also being provided means for lubricating the slip rings to facilitate the rotation of rotatable ones of the slip rings with respect to fixed ones of the slip rings.

Another object of this invention is to provide a novel slip ring construction which includes an insulated spindle on which there are mounted pairs of slip rings disposed in face-to-face engagement, the slip rings being retained in place by a simple clamp device which is of such a nature that the entire slip ring assembly may be readily assembled or disassembled as is necessary.

Still another object of this invention is to provide a slip ring construction wherein there is provided a pair of slip rings disposed in face-to-face engagement, the slip rings having opposed lubricant receiving grooves and at least one of the slip rings being provided with a lubricating fitting having a passage opening into one of the lubricant receiving grooves so that the slip rings may be properly lubricated to facilitate relative rotation between the slip rings while the rings are maintained in face-to-face contact.

A further object of this invention is to provide a reel for electric power cables, the reel including a drum which is rotatably mounted on a fixed shaft, the shaft having mounted in a free end thereof a slip ring construction which is housed within a recess in an end of the drum, the slip ring construction including fixed slip rings which are rigidly mounted relative to the shaft and rotatable slip rings which are connected to the drum in insulated relation for rotation therewith whereby a wire may be led through the shaft, connected to the slip ring construction, and a second wire reeled on the drum and connected to the rotatable slip rings of the slip ring construction so that a continuous circuit is maintained at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical sectional view taken through the slip ring construction per se substantially upon the plane indicated by the section line 3—3 of FIGURE 2 and shows the specific details of the construction thereof;

FIGURE 4 is an enlarged perspective view of the connecting block;

FIGURE 5 is an enlarged exploded perspective view of the various components of the slip ring construction; and FIGURE 6 is an enlarged vertical transverse sectional view taken substantially upon the plane indicated by the section line 6—6 of FIGURE 3 and shows the arrangement of the wires within the spindle of the slip ring construction.

Figure 1:
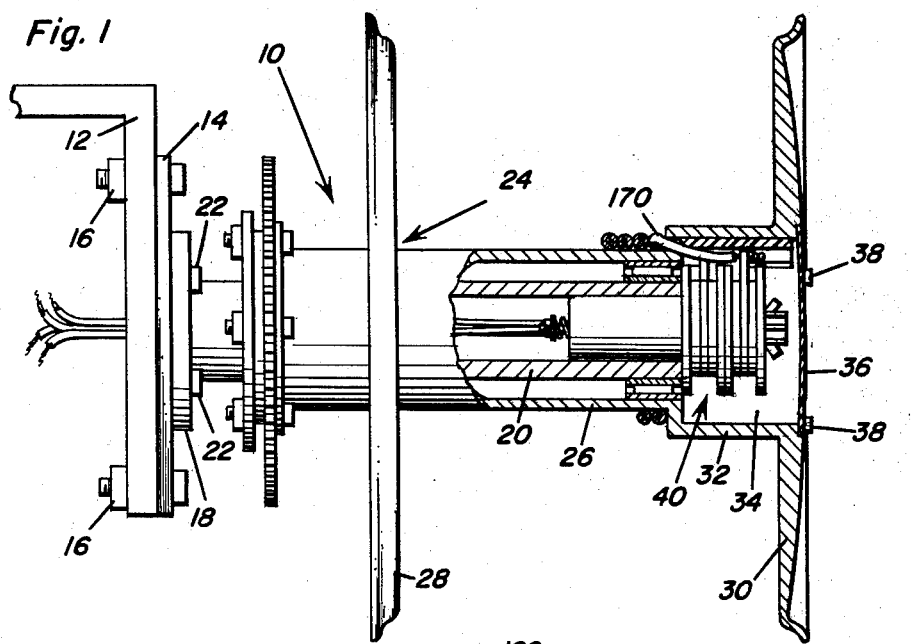
FIGURE 1 is an elevational view of the reel which is the subject of this invention with portions thereof broken away and shown in section in order to illustrate the position of the slip ring construction which is the subject of this invention.

Referring now to the drawings in detail, it will be seen that there is illustrated an electric cable reel which embodies the present invention, the reel being referred to in general by the reference numeral 10.

The reel 10 is mounted upon a suitable support 12 to which there is secured a mounting plate 14 by means of fasteners 16. In turn, there is secured to the mounting plate 14 a flange 18 of a stationary tubular support shaft 20. The flange 18 is secured to the mounting plate 14 by means of fasteners 22.

Suitably journaled on the support shaft 20 is a drum which is referred to in general by the reference numeral 24. The drum 24 may be of any desired construction, but requires at least a tubular center 26 and a pair of ends 28 and 30. Also, it is necessary that the tubular center 26 includes a diametrically enlarged portion 32 which forms, together with an opening in the end 30, a recess which is referred to by the reference numeral 34. The recess 34 has the right end thereof, as viewed in FIGURE 1, open and this recess end is normally closed by means of a removable cover plate 36 which is secured to the end 30 by means of fasteners 38.

Carried by the support shaft 20 and projecting into the recess 34 is a slip ring construction which is referred to in general by the reference numeral 40 and includes an elongated spindle which is referred to in general by the reference numeral 42. The spindle 42 includes a main body portion 44 which is cylindrical in outline and which has a longitudinal keyway 46 formed therein which receives a key (not shown) keying the spindle 42 to the support shaft 20. The spindle 42 also includes a reduced end portion 48 which is generally rectangular in cross-section, but which has longitudinal grooves 50 formed in opposite sides thereof opening into bores 52 and 54 which extend through the main body portion 44 in spaced parallel relation.

Extending through the spindle 42 the entire length thereof is a small diameter bore 56 which terminates at the left end of the spindle 42 in an enlarged bore 58. Intersecting the bore 56 adjacent the right end thereof, as viewed in FIGURE 3, is a vertical slot 60.

Mounted on the reduced end portion 48 first is an insulator 62 which is circular in outline and has a square opening 64 therethrough receiving the reduced portion 48. The insulator 62 abuts the right end of the body portion 44 as will be aparent from FIGURE 3.

Disposed next to the insulator 62 is a first fixed slip ring 66 which abuts the insulator 60 and is formed of brass, copper or other material which will readily transmit electricity and which has a square opening 68 therethrough for receiving the reduced end portion 48 and thus preventing rotation of the slip ring 66 thereon.

As is best shown in FIGURE 3, the fixed slip ring 66 has a reduced diameter bearing portion 70 projecting to the right. Rotatably journaled on the bearing portion 70 is a rotatable slip ring 72. The rotatable slip ring 72 has a large diameter bore 74 therethrough corresponding to the diameter of the bearing portion 70. Also extending tangentially from the rotatable slip ring 72 is an extension 76 provided with a terminal 78.

Disposed next to the rotatable slip ring 76 is a second fixed slip ring 80. The fixed slip ring 80 has a square opening 82 therethrough receiving the reduced portion 48 and locking the slip ring 80 against rotation.

Connected to the slip ring 66, as shown in FIGURE 5, is a wire 84. A similar wire 86 is connected to the slip ring 80. A third wire 88 is connected to the terminal 78. Power passes to the slip rings 66 and 80 through the wires 84 and 86 and such power is transmitted to the wire 88 through the slip ring 72.

In order that the slip ring 72 may freely rotate between the slip rings 66 and 80 at the same time the desired electrical contact be maintained, there is formed in the abutting faces of the slip rings 66, 72 and 80 lubricant receiving grooves 90. In order to facilitate the placing of lubricant in the grooves 90, the extension 76 is provided with a lubricating or grease fitting 92, see FIGURE 3, which opens into a lubricating passage 94 which in turn opens into the lubricating grooves 90.

Disposed next to the fixed slip ring 80 is a pair of insulators 96 and 98 which are identical with the insulator 62 and have central openings 100 of a cross-section to receive the reduced end portion 48.

Disposed next to the insulator 98 is a fixed slip ring 102 substantially identical to the fixed slip ring 66 and which has a square opening 104 in the center thereof for receiving the reduced end portion 48. Also, the right side thereof, as viewed in FIGURE 3, is provided with a diametrically reduced axially projecting bearing portion 106.

Disposed in abutting relation to the fixed slip ring 102 is a rotatable slip ring 108 provided with a central circular inner surface 110 which rides on the bearing portion 106 so as to rotatably suport the slip ring 108. The slip ring 108 also includes a tangential extension 112 which is disposed in parallel relation to the tangential extension 76 of the slip ring 72, but it is offset therefrom and is provided with a terminal 114.

Disposed in abutting relation to the rotatable slip ring 102 substantially identical to the fixed slip ring 66 and to the fixed slip ring 80 and has a central opening 118 therethrough. Disposed next to the fixed slip ring 116 is an insulator 120 having a central opening 122 for receiving the reduced end portion 48.

Secured to the left side of the fixed slip ring 102 is a wire 124 while a similar wire 126 is connected to the left side of the fixed slip ring 116. A wire 128 is connected to the terminal 114. Inasmuch as the slip ring 108 is disposed intermediate the slip rings 102 and 116 in face-to-face contact therewith, it will be seen that the wire 128 is electrically connected to the wires 124 and 126.

Figure 2:
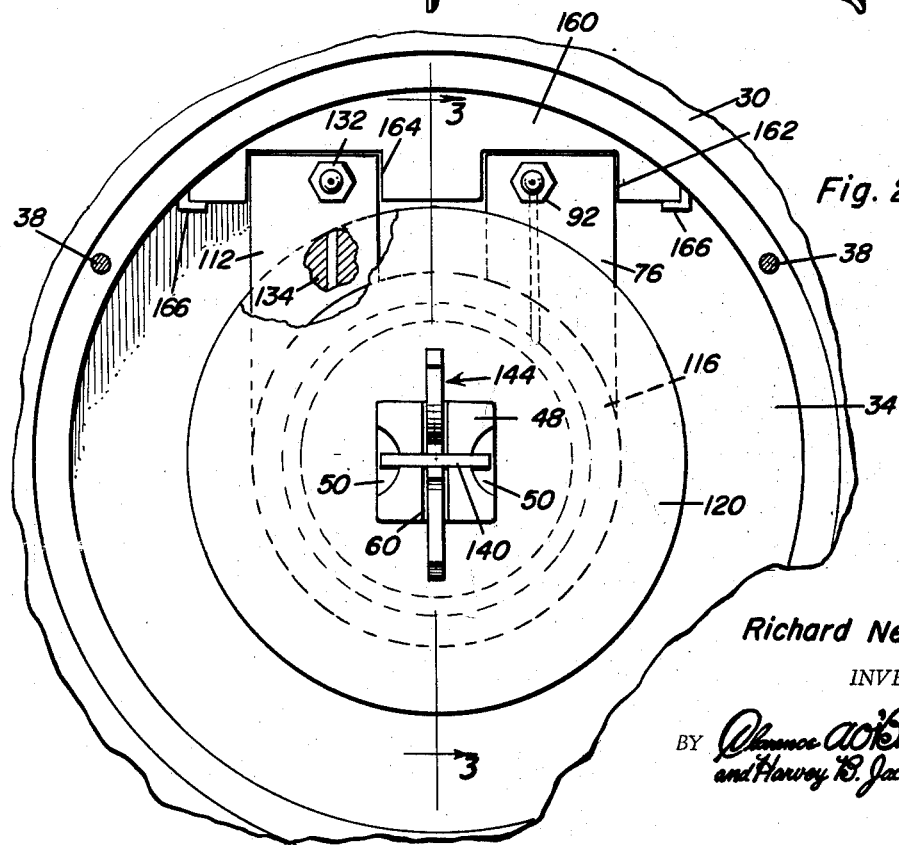
FIGURE 2 is an enlarged fragmentary end view of the reel of FIGURE 1 and shows the relationship of the components of the slip ring construction with respect to the drum, a cover plate for the drum being omitted.

In order to facilitate the rotation of the slip ring 108 relative to the slip rings 102 and 116, there are formed in the faces of these slip rings alined lubricating material receiving recesses 130 which are circular in outline and semi-circular in cross-section. The extension 112 carries a grease fitting 132 similar to the grease fitting 92 and is communicated with the recesses 130 by means of a grease passage 134 formed in the extension 112, as is best shown in FIGURE 2.

In order that the various slip rings and the insulators may be retained on the reduced end portion 48, there is positioned in the bore 56 a rod of a clamp, the rod being referred to by the reference numeral 136. The rod 136 is provided at one end with threads 138 and at the opposite end with a flat generally triangular extension 140 having a slot 142 therein alined with the rod 136.

Associated with the head 140 is a retainer 144. The retainer 144 has generally the shape of an arrowhead and includes a projecting portion 146 on one edge thereof and a recess 148 on the opposite edge thereof in alinement with the projecting portion 146. Extending to opposite sides thereof are ears 150.

The clamp also includes a sleeve 152, a coil spring 154, a washer 156 and a nut 158. All of these elements are disposed at the left side of the spindle 42, as viewed in FIGURE 3.

In assembling the slip ring construction 40, the various slip rings and insulators are placed on the reduced end portion 48. The rod 136 is then passed through the spindle 42 from right to left. The retainer 144 is placed in the slot 142 and slides into the slot 60 in the reduced end portion 48 of the spindle 42. The projecting portion 146 of the retainer 144 is of a size to be received within the opening 122 in the insulator 120. However, the ears 150 engage the face of the insulator 120. The sleeve 152 is positioned in the enlarged bore portion 58 and the spring 154 is telescoped within the sleeve 152. Next the washer 156 is placed on the rod 56 after which the nut 158 is threaded on the threaded end portion 138. The nut 158 is tightened down until the retainer 144 tightly clamps the slip rings and insulators against the body portion 44 of the spindle 42.

In order that the slip rings 72 and 108 may rotate in unison, there is provided a connecting block 160 formed of an insulating material and in the shape of a chordal segment as shown in FIGURE 4. The block 160 has a pair of longitudinally extending slots 162 and 164 therein which receive the outer ends of the extensions 76 and 112. As is best illustrated in FIGURE 2, the block 160 is seated within the recess 34 between a pair of retainers 166 carried by the end 30 of the drum 24.

The wires 84, 86, 124 and 126 pass through the spindle 42, into the support shaft 20 and out through the left end of the support shaft 20, as is best shown in FIGURE 1. These wires are then connected to any available fixed source of electrical energy. On the other hand, the wires 88 and 128 pass through the center 26 of the drum 24 and form part of an elongated cable 170 which is reeled on the drum 24. Because of the particular construction of the slip ring construction 40, it will be readily apparent that the cable of which the wires 88 and 128 form a part may carry the desired loads. At the same time, the drum 24 may freely rotate inasmuch as the contact surfaces of the various slip rings are lubricated. Incidentally, this lubrication should be accomplished by means of a suitable lubricating material which will also function as a conductor. In addition to this, it will be seen that the various elements in the slip ring construction 40 are so mounted whereby they may be readily replaced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A slip ring construction comprising a dielectric spindle including an end portion of non-circular cross-section having a laterally enlarged shoulder, a slip ring assembly mounted upon said end portion, means axially and compressively releasably clamping said assembly against said shoulder, said assembly comprising axially spaced sets of electrically conductive slip rings, each set including a fixed ring having a non-circular aperture by which it is slidably but non-rotatably secured to said end portion and a laterally offset bearing member at one side, each set further including a movable ring having a central aperture by which it is journaled on said bearing member of the associated fixed ring, said associated fixed and movable rings having annular planar surfaces in continuous electrically conductive engagement over the entire area of the movable ring surface, complementary annular lubricant grooves in the mating surfaces of the rings of each set, means for supplying lubricant to said grooves.

2. The combination of claim 1 wherein said spindle has a longitudinal passage therethrough, said clamping means being disposed in and extending through said passage with its opposite ends compressively engaging said spindle and said assembly.

3. The combination of claim 2 wherein said end portion has an axially extending slot therein, said clamping means including a laterally projecting key slidably guided in said slot and extending laterally therefrom into compressive and abutting engagement with said assembly.

4. The combination of claim 3 wherein said passage is diametrically enlarged at the other end of said spindle from said end portion to provide a chamber, said clamping means having a compression spring secured thereto and housed within and abutting a wall of said chamber.

5. The combination of claim 1 wherein each set of slip rings is embraced between dielectric rings, the latter having non-circular apertures by which they are slidably but non-rotatably mounted upon said end portion.

6. The combination of claim 5 wherein adjacent sets of slip rings have a dielectric ring compressively embraced therebetween.

7. The combination of claim 1 includindg a dielectric member having a slidable but non-rotative keying engagement with said movable rings whereby to maintain a relatively fixed angular relation between said movable rings.

8. The combination of claim 7 wherein said member is provided with spaced channels in side-by-side arrangement, each movable ring having a keying projection slidably received in one of said chambers.

9. The combination of claim 1 wherein each set of rings includes a second fixed ring fixedly secured on each end portion, each movable ring being compressively embraced by the first mentioned fixed ring and said second fixed ring.

References Cited in the file of this patent
UNITED STATES PATENTS

| | | |
|---|---|---|
| 1,123,602 | Sessions | Jan. 5, 1915 |
| 1,166,753 | Finizio | Jan. 4, 1916 |
| 1,277,582 | Heim | Sept. 3, 1918 |
| 1,596,557 | Scholes | Aug. 17, 1926 |
| 1,665,737 | Gough | Apr. 10, 1928 |
| 2,138,631 | Gardella | Nov. 29, 1938 |
| 2,319,443 | Corte | May 18, 1943 |
| 2,325,805 | Shoffner | Aug. 3, 1943 |
| 2,387,556 | Baunach | Oct. 23, 1945 |
| 2,523,081 | Wendt | Sept. 19, 1950 |
| 2,612,569 | Moon | Sept. 30, 1952 |
| 2,832,056 | Stutzman | Apr. 22, 1958 |

OTHER REFERENCES

German printed application—Papst, German application Serial No. P3950, printed Dec. 20, 1956 (KHO2k).